(12) United States Patent
Tsai

(10) Patent No.: US 7,461,616 B2
(45) Date of Patent: Dec. 9, 2008

(54) ENVIRONMENTAL FRIENDLY ANIMAL EXCREMENT COLLECTOR

(75) Inventor: Chia-Chien Tsai, Taipei (TW)

(73) Assignee: Apple Ju Studio Inc., Taipei (TW)

( * ) Notice: Subject to any disclaimer, the term of this patent is extended or adjusted under 35 U.S.C. 154(b) by 0 days.

(21) Appl. No.: 11/732,049

(22) Filed: Apr. 2, 2007

(65) Prior Publication Data

US 2007/0227466 A1 Oct. 4, 2007

Related U.S. Application Data

(63) Continuation-in-part of application No. 11/383,484, filed on May 15, 2006, now abandoned.

(30) Foreign Application Priority Data

Apr. 4, 2006 (TW) ............................... 95205713 U (51) Int. Cl.
*A01K 23/00* (2006.01)
(52) U.S. Cl. ...................................... 119/868; 119/867
(58) Field of Classification Search ................. 119/867, 119/868, 869
See application file for complete search history.

(56) References Cited

U.S. PATENT DOCUMENTS

| | | | |
|---|---|---|---|
| 2,882,858 A | | 4/1959 | Dlugi |
| 3,875,903 A | * | 4/1975 | Sarvary ........................ 119/868 |
| 5,315,960 A | * | 5/1994 | Lamp ........................... 119/868 |
| 5,386,802 A | * | 2/1995 | Hang-Fu ....................... 119/868 |
| 6,722,319 B1 | * | 4/2004 | Chiu ............................ 119/868 |
| 2006/0124076 A1 | * | 6/2006 | Tseng .......................... 119/868 |

FOREIGN PATENT DOCUMENTS

| | | | |
|---|---|---|---|
| DE | 10350290 | * | 5/2004 |
| DE | 10315952 | | 10/2004 |
| ES | 2068757 | | 4/1995 |
| WO | WO 2005/039278 | * | 5/2005 |

* cited by examiner

*Primary Examiner*—David J Parsley
(74) *Attorney, Agent, or Firm*—The Webb Law Firm (57) ABSTRACT

An environmental friendly animal excrement collector includes: a supporting base including a first pad and a plurality of first magnetic tablets, the first pad being formed with a plurality of spaced apart first retaining holes that are distributed along the length of the first pad, each of the first magnetic tablets being received in a respective one of the first retaining holes; and a collecting device including a second pad, a plurality of second magnetic tablets, and a flexible collecting bag connected to the second pad. The second pad is formed with a plurality of second retaining holes. Each of the second magnetic tablets is received in a respective one of the second retaining holes and is attracted magnetically to a respective one of the first magnetic tablets.

12 Claims, 9 Drawing Sheets

ENVIRONMENTAL FRIENDLY ANIMAL EXCREMENT COLLECTOR

CROSS-REFERENCE TO RELATED APPLICATION

This application claims priority of Taiwanese Application No. 095205713, filed on Apr. 4, 2006. This application is also a continuation-in-part of U.S. patent application Ser. No. 11/383,484, filed on May 15, 2006 now abandoned.

BACKGROUND OF THE INVENTION

1. Field of the Invention

This invention relates to an environmental friendly animal excrement collector, more particularly to an environmental friendly animal excrement collector including a supporting base and a collecting device attached magnetically to the supporting base.

2. Description of the Related Art

U.S. Patent Application Publication No. 2006/0124076 A1 discloses an animal excrement collector that includes a supporting base, harness means connected to the supporting base, a U-shaped retaining member secured to the supporting base using an adhesive material or hook and loop means, or through stitching, and a collecting device having a collecting bag and an upper ring secured to an open end of the collecting bag using the adhesive material and engageable with the retaining member so as to permit attachment of the collecting device to the supporting base. The upper ring may be provided thereon with an adhesive material, fastening means, or hook and loop means in order that the upper ring may serve as a sealing member by folding the same into two halves and joining together the halves so as to enclose the open end of the collecting bag when the excrement is collected in the collecting bag. The retaining member formed on the supporting base may be an adhesive material or a hook and loop device. In one example, the retaining member is a hook and loop device, and a U-shaped bracket is used and is attached to the supporting base through the hook and loop device. The U-shaped bracket is formed with a slot for engaging an edge of the upper ring therein, thereby attaching the collecting bag to the supporting base.

The aforesaid conventional animal excrement collector is disadvantageous in that since attachment of the upper ring together with the collecting bag and/or the U-shaped bracket to the retaining member on the supporting base is conducted through the adhesive material or the hook and loop device, careful alignment between the upper ring or the U-shaped bracket and the retaining member prior to the attachment is required, which results in inconvenience and waste of time during the attaching operation. Misalignment between the upper ring or the U-shaped bracket and the retaining member can increase the chance of bringing the upper ring or the U-shaped bracket into contact with the animal's excrement and results in an adverse effect on the appearance of the assembly thus formed. Moreover, attachment of such also tends to cause trouble in detachment of the collecting device from the retaining member such that a smooth and fast detachment is difficult to achieve, and result in undesired attachment of animal's hair and dirt to the adhesive material or the hook and loop device. Furthermore, the supporting base has a U-shaped structure with two opposing arms and a cross member interconnecting and cooperating with the arms to define a discharging opening aligned with the animal's anus, and a notch separate from the discharging opening for extension of the root of the animal's tail therethrough so as to confine the root of the animal's tail thereat and for preventing the animal's tail from extending through the discharging opening to interfere with the collecting bag. In addition, the perimeter or the diameter of an open end of the collecting bag is required to match in dimension that of the upper ring or that of the retaining member on the supporting base. Hence, the collecting bag can only be obtained through manufacturing of this particular type and cannot be obtained through recycled or used bags, which is not environmental friendly. Also, replacement of the collecting bag is relatively inconvenient. The cross member serves as an abutting wall such that when the supporting base is pulled frontwardly due to bending of the animal's body during excretion, the cross member will be brought to abut against the root of the animal's tail, thereby preventing further frontward movement of the supporting base. However, since the pulling force is relatively large, abutment of the cross member against the animal's tail is likely to cause discomfort to the animal and loosening of the straps of the harness means, thereby resulting in downward movement of the supporting base, which, in turn, results in disposition of the cross member into the course of the animal's excrement discharged from the anus of the animal, thereby undesirably bringing the cross member into contact with the animal's excrement. In addition, the aforesaid animal excrement collector is not suitable for dogs having a relatively short tail, such as bulldog, Schnauzer, Doberman, and the like, since the cross member of the supporting member tends to pass over the dog's tail during excretion, thereby resulting extension of the dog's tail into the discharging opening in the supporting member or the collecting bag or misalignment between the discharging opening and the animal's anus.

SUMMARY OF THE INVENTION

Therefore, the object of the present invention is to provide an environmental friendly animal excrement collector that can overcome the aforesaid drawbacks of the prior art, that permits the use of recycled or used bags as the collecting bag for collecting the animal's excrement, and that facilitates replacement of the collecting bag and attachment and detachment of the collecting bag to and from the supporting base.

According to one aspect of this invention, there is provided an environmental friendly animal excrement collector that comprises: a supporting base including a generally U-shaped first pad and a first magnetic unit having a plurality of first magnetic tablets, the first pad defining a first discharging opening and being formed with a plurality of spaced apart first retaining holes that are distributed along the length of the first pad in such a manner to surround the first discharging opening, each of the first magnetic tablets being received securely in a respective one of the first retaining holes; a harness unit connected to the supporting base and adapted to harness the supporting base to an animal; and a collecting device attached magnetically and detachably to the supporting base and including a generally U-shaped second pad, a second magnetic unit having a plurality of second magnetic tablets, and a flexible collecting bag connected to the second pad and defining an inlet. The second pad is formed with a plurality of spaced apart second retaining holes corresponding respectively to the first retaining holes. Each of the second magnetic tablets is received securely in a respective one of the second retaining holes and is attracted magnetically to a respective one of the first magnetic tablets so as to permit attachment of the collecting bag to the supporting base and alignment of the inlet of the collecting bag with the first discharging opening of the first pad.

According to another aspect of this invention, there is provided an environmental friendly animal excrement collector that comprises: a generally U-shaped first pad defining a first discharging opening and having a contact surface; a harness unit connected to the first pad and adapted to harness the first pad to an animal; a generally U-shaped second pad defining a second discharging opening and having a contact surface, the second pad being magnetically attracted to the first pad; and a flexible collecting bag having a main body and a cuff. The main body has an open end defining an inlet that is aligned with the first and second discharging openings. The cuff is folded curvedly from the open end of the main body to define a cuff space therebetween. The second pad is inserted removably into the cuff space. The open end of the main body has a retaining portion extending along the length of the second pad and sandwiched between and in contact with the contact surfaces of the first and second pads. The main body of the collecting bag extends through the second discharging opening along an inner periphery of the second discharging opening.

According to yet another aspect of this invention, there is provided an environmental friendly animal excrement collector that is adapted to be connected to a collecting bag and that comprises: a supporting base including a first pad and a first magnetic unit having a plurality of first magnetic tablets, the first pad defining a first discharging opening and being formed with a plurality of spaced apart first retaining holes that are distributed along the length of the first pad in such a manner to surround the first discharging opening, each of the first magnetic tablets being received securely in a respective one of the first retaining holes; a harness unit connected to the supporting base and adapted to harness the supporting base to an animal; and a collecting device attached magnetically and detachably to the supporting base and including a second pad that conforms to the first pad and that is adapted to cooperate with the first pad to sandwich a portion of the collecting bag therebetween, and a second magnetic unit having a plurality of second magnetic tablets. The second pad is formed with a plurality of spaced apart second retaining holes corresponding respectively to the first retaining holes. Each of the second magnetic tablets is received securely in a respective one of the second retaining holes and is attracted magnetically to a respective one of the first magnetic tablets.

BRIEF DESCRIPTION OF THE DRAWING

Other features and advantages of the present invention will become apparent in the following detailed description of the preferred embodiment of this invention, with reference to the accompanying drawing, in which.

DETAILED DESCRIPTION OF THE PREFERRED EMBODIMENT

FIGS. 1 to 5 illustrate the preferred embodiment of an environmental friendly animal excrement collector according to this invention for animals, such as a dog. The environmental friendly animal excrement collector includes: a supporting base 2 including a first pad 21 and a first magnetic unit 22 having a plurality of first magnetic tablets 221, the first pad 21 defining a first discharging opening 210 and being formed with a plurality of spaced apart first retaining holes 211 that are distributed along the length of the first pad 21 in such a manner to surround the first discharging opening 210, each of the first magnetic tablets 221 being embedded securely in the first pad 21 in a respective one of the first retaining holes 211 (or simply received in a respective first retaining hole 211); a harness unit 3 connected to the supporting base 2 and adapted to harness the supporting base 2 to an animal; and a collecting device 4 attached magnetically and detachably to the supporting base 2 and including a second pad 41 that conforms to the first pad 21, a second magnetic unit 42 having a plurality of second magnetic tablets 421, and a flexible collecting bag 43 connected to the second pad 41 and defining an inlet 430. The second pad 41 has a shape conforming to that of the first pad 21, defines a second discharging opening 410 conforming to the first discharging opening 210, and is formed with a plurality of spaced apart second retaining holes 411 corresponding respectively to the first retaining holes 211. Each of the second magnetic tablets 421 is embedded securely in the second pad 41 in a respective one of the second retaining holes 411 (or simply received in a respective second retaining hole 411) and is attracted magnetically to a respective one of the first magnetic tablets 211 so as to permit attachment of the collecting bag 43 to the supporting base 2 and alignment of the inlet 430 of the collecting bag 43 with the first discharging opening 210 of the first pad 21 and the second discharging opening 410 of the second pad 41.

Figure 3:
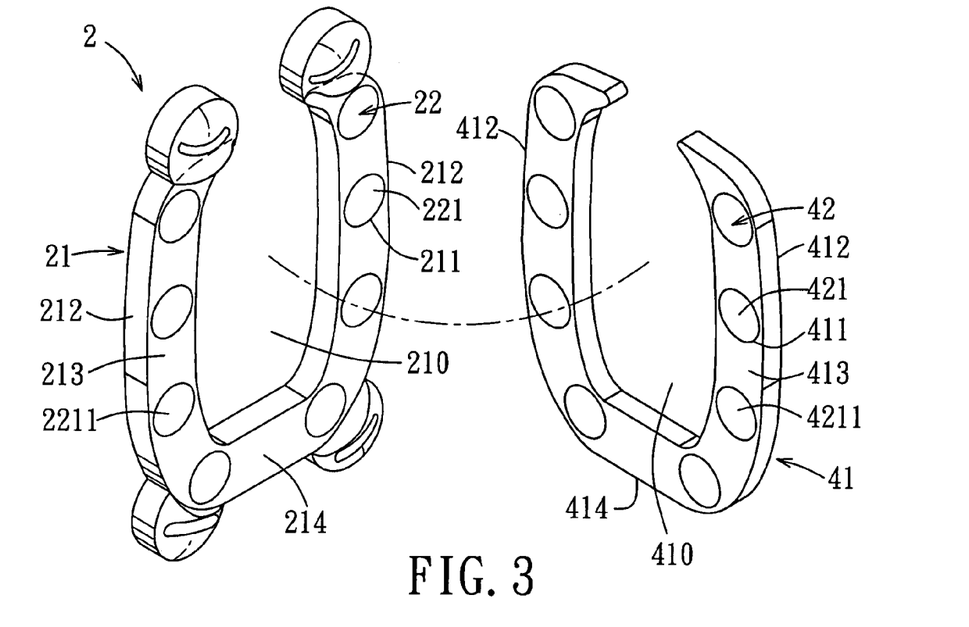
FIG. 3 is an exploded perspective view to illustrate arrangement of first and second magnetic tablets embedded respectively in first and second pads of the preferred embodiment.
Figure 4:
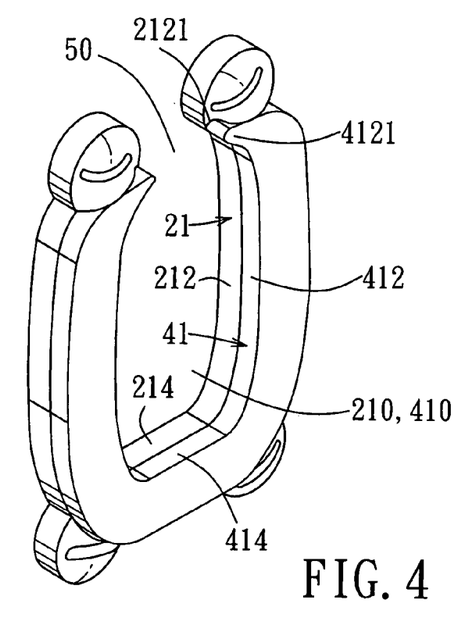
FIG. 4 is an assembled perspective view to illustrate the structure of the first and second pads of the preferred embodiment.
Figure 5:
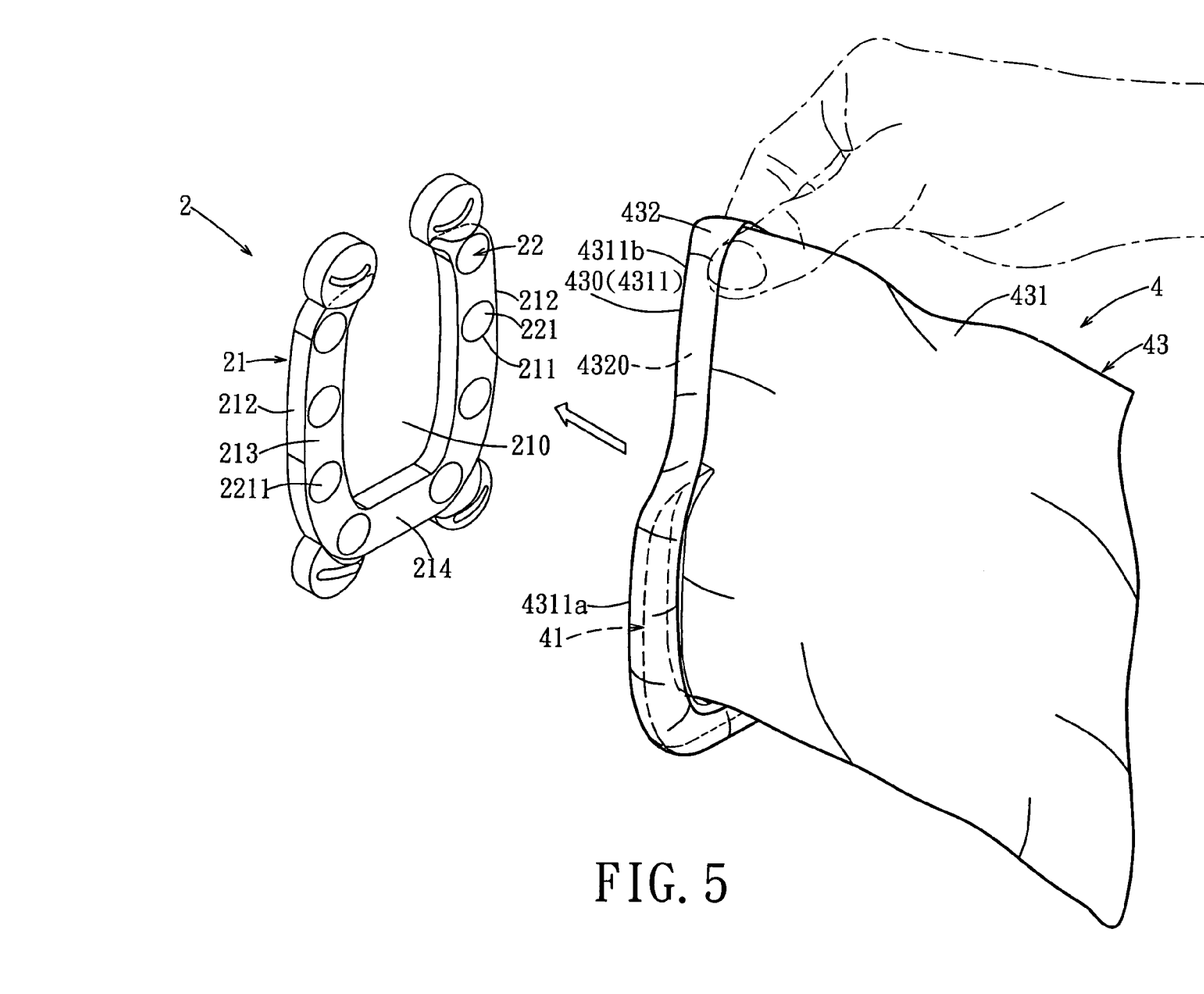
FIG. 5 is a perspective view to illustrate how the second pad is received in a cuff space of a cuff of a collecting bag of the preferred embodiment for attaching the collecting bag to the first pad.

In this embodiment, each of the first and second pads 21, 41 is generally U-shaped, and is made from an elastic material, such as rubbers and elastomers, and has two free arm portions 212 (412). The first magnetic unit 22 is divided into two columns of the first magnetic tablets 221 disposed respectively at the free arm portions 212 of the first pad 21. The second magnetic unit 42 is divided into two columns of the second magnetic tablets 421 disposed respectively at the free arm portions 412 of the second pad 41. Each of the first and second pads 21, 41 has a contact surface 213 (413). The contact surfaces 213, 413 of the first and second pads 21, 41 face toward each other in a face-to-face manner. Each of the first and second magnetic tablets 221, 421 has a contact end 2211 (4211) that is disposed adjacent to and that is substantially flush with the contact surface 213 (413) of a respective one of the first and second pads 21, 41. The contact ends 2211 of the first magnetic tablets 221 of the columns of the first magnetic unit 22 have a first magnetic polarity, while the contact end 4211 of each of the second magnetic tablets 421 has a second magnetic polarity opposite to the first magnetic polarity.

In this embodiment, each of the first and second magnetic tablets 221, 421 is cylindrical in shape and is received fittingly in the respective one of the first and second retaining holes 211, 411. Each of the first magnetic tablets 221 or the second magnetic tablets 421 preferably has a diameter less than the distance thereof from an adjacent one of the first magnetic tablets 221 or the second magnetic tablets 421.

Figure 6:
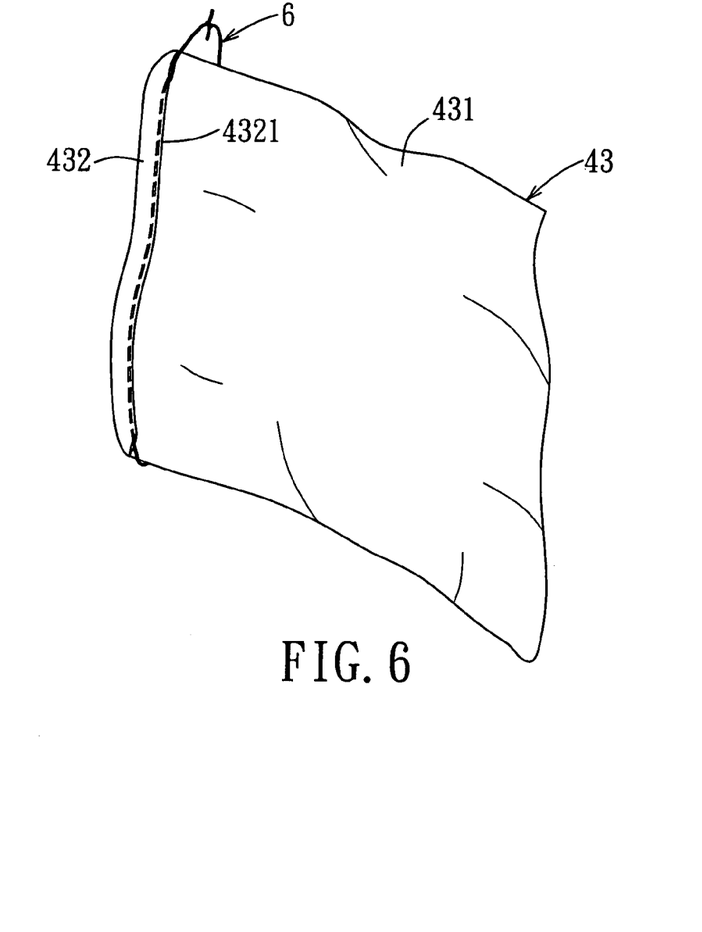
FIG. 6 is a perspective view to illustrate how a string is connected to the cuff of the collecting bag of the preferred embodiment.

In this embodiment, the collecting bag 43 is in the form of a transparent plastic bag, and has a main body 431 that has an open end 4311 defining the inlet 430, and a cuff 432 folded curvedly from the open end 4311 of the main body 431 to define a cuff space 4320 therebetween. The second pad 41 is inserted removably into the cuff space 4320. The open end 4311 of the main body 431 has a retaining portion 4311a extending along the length of the second pad 41 and sandwiched between and in contact with the contact surfaces 213, 413 of the first and second pads 21, 41. The main body 431 of the collecting bag 43 extends through the second discharging opening 410 along an inner periphery of the second discharging opening 410. The collecting bag 43 preferably has a diameter greater than the length of the second pad 41 so that the remainder of the open end 4311 of the collecting bag 43 (i.e., an upper portion extending from the retaining portion 4311a of the open end 4311 of the collecting bag 43 which overlaps the second pad 41), which defines a holding portion 4311b of the open end 4311 extending outwardly of the second pad 41 from the retaining portion 4311a (see FIG. 5), has a sufficient length for pinching during attachment and detachment of the collecting device 4 to and from the supporting base 2. In addition, the cuff 432 is optionally formed with an end sleeve 4321 (see FIG. 6) that is sleeved on a string 6 which permits closing of the collecting bag 43 after the collecting bag 43 is detached from the supporting base 2 and the second pad 41.

In this embodiment, each of the first and second pads 21, 41 further has a back portion 214 (414) interconnecting the free arm portions 212 (412). The free arm portions 212, 412 of each of the first and second pads 21, 41 are opposite to each other in a first direction. The free arm portions 212, 412 of each of the first and second pads 21, 41 have bent free ends 2121 (4121) bent therefrom toward each other. The bent free ends 2121, 4121 of the free arm portions 212, 412 of the first and second pads 21, 41 cooperatively define a gap 50 there among. The gap 50 thus formed is opposite to the back portions 214, 414 of the first and second pads 21, 41 in a second direction perpendicular to the first direction, and is in spatial communication with the first discharging opening 210 in the first pad 21 and the second discharging opening 410 in the second pad 41. Not only can formation of the gap 50 reduce the possibility of undesired contact of the bent free ends 2121, 4121 of the free arm portions 212, 412 of the first and second pads 21, 41 with the animal's excrement discharged from the anus of the animal, but also ensure retaining of the second pad 41 in the cuff space 4320 and permit free movement of the root of the animal's tail up and down, thereby preventing abutment of the cross member against the animal's tail and movement of the supporting base out of the position to be aligned with the anus of the animal as encountered in the aforesaid conventional environmental friendly animal excrement collector. Preferably, the bent free end 2121 (4121) of each of the free arm portions 212, 412 of each of the first and second pads 21, 41 is tapered to form a tip so as to enhance the effect on the reduction of the possibility of undesired contact of the bent free ends 2121, 4121 of the free arm portions 212, 412 of the first and second pads 21, 41 with the animal's excrement discharged from the anus of the animal.

Figure 1:
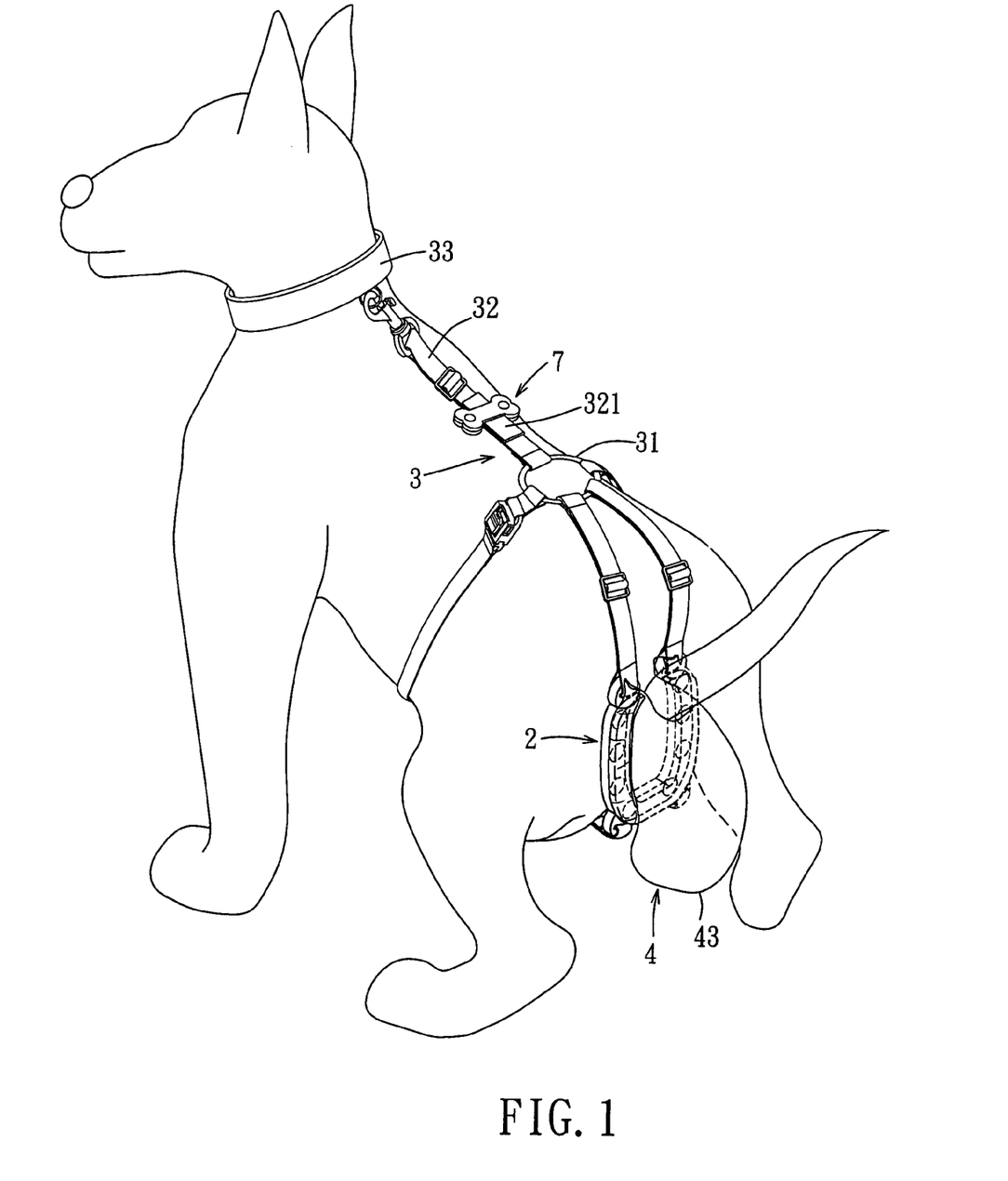
FIG. 1 is a perspective view of the preferred embodiment of an environmental friendly animal excrement collector according to this invention in a state of use.
Figure 2:
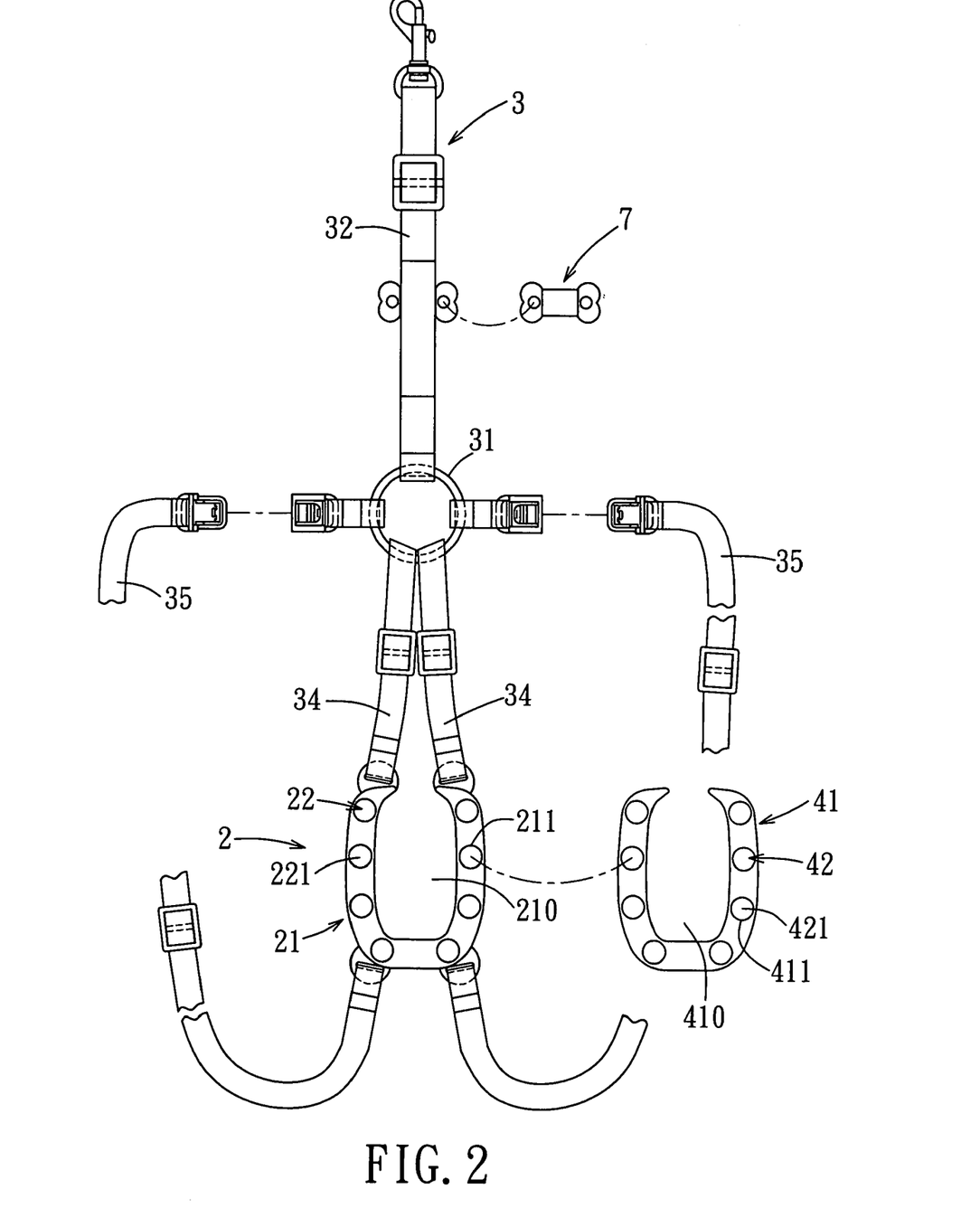
FIG. 2 is a fragmentary schematic exploded view of the preferred embodiment.

In this embodiment, the harness unit 3 includes a connecting ring 31, a front trailing strap 32 having a front end adapted to be connected to a neck collar 33 and a rear end connected to the connecting ring 31, a pair of rear trailing straps 34 having front ends connected to the connecting ring 31 and rear ends connected to a front end of the first pad 21, and a pair of side trailing straps 35 having front ends connected to the connecting ring 31 and rear ends connected to a rear end of the first pad 21.

Figure 7:
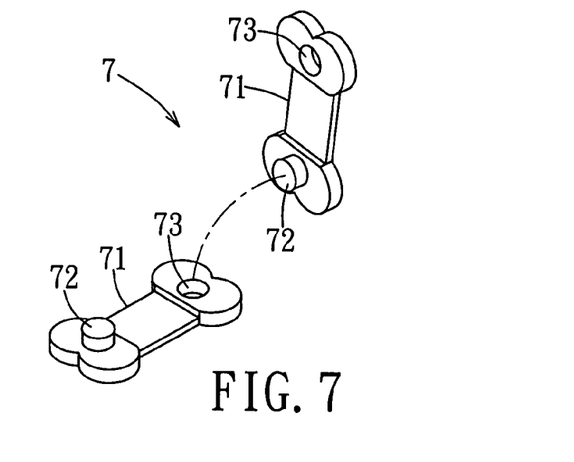
FIG. 7 is an exploded perspective view to illustrate the structure of a clamping member of the preferred embodiment.

A clamping unit 7 for binding an end portion of a selected one of the front and rear trailing straps 32, 34 and the side trailing straps 35 in order is optionally provided when the length of the selected one of the front and rear trailing straps 32, 34 and the side trailing straps 35 is too long. In this embodiment, the clamping unit 7 is used to bind an end portion 321 of the front strap 32, as best illustrated in FIG. 1. The clamping unit 7 includes two flexible clamping pieces 71 (see FIG. 7), each of which is made from an elastic material, such as rubbers and elastomers, and has two opposite ends that are respectively formed with a tongue 72 and a groove 73. The tongue 72 and the groove 73 of one of the clamping pieces 71 are engageable respectively with the groove 73 and the tongue 72 of the other of the clamping pieces 71 in a press fit manner (see FIG. 1).

Referring to FIGS. 1, 5, 10 and 11, in use, the supporting base 2 is put on the buttocks of the animal and is aligned with the anus of the animal through wearing and adjustment of the harness unit 3, the collecting bag 43, for example in the form of a sandwich bag, is folded to form the cuff 432, the second pad 41 provided with the second magnetic tablets 421 is subsequently inserted into the cuff space 4320, and the collecting bag 43 carried with the second pad 41 can then be pinched by the fingers (see FIG. 5) and then moved toward the supporting base 2 to carry out the attaching operation without pre-alignment and the use of the other hand to hold the supporting base 2. Detachment of the collecting bag 43 from the supporting base 2 can be easily carried out solely by one hand by pinching a holding portion 4311b of the open end 4311 which extends from the retaining portion 4311a and which is disposed outwardly of the second pad 41 (see FIGS. 11 and 12), followed by peeling therefrom (see FIGS. 9A to 9C). It is noted that since the first and second pads 21, 41 are U-shaped and have a sufficient length, slight upward movement of the supporting base 2 due to bending of the animal's body during excretion is therefore no longer causing the aforesaid misalignment drawback, and the first and second discharging openings 210, 410 can be still aligned with the anus of the animal at the new position, thereby preventing the first pad 21 from contacting the excrement during excretion of the animal.

Figure 8A:
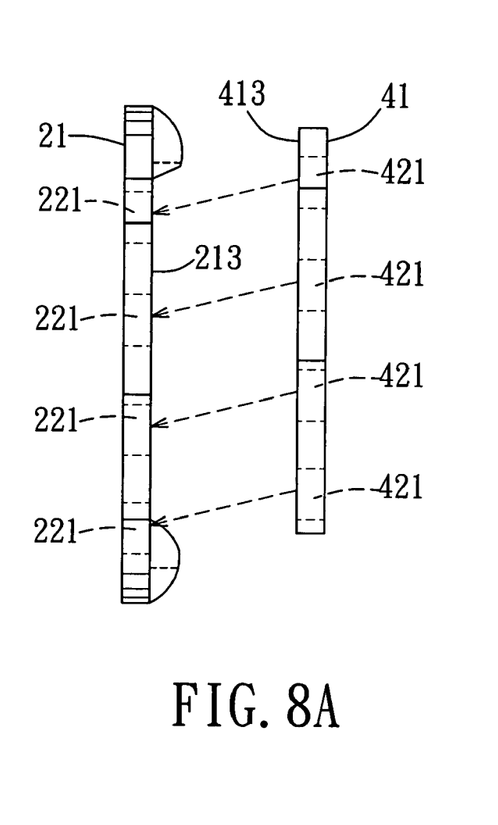
FIGS. 8A and 8B are schematic side views to illustrate consecutive steps of how the second pad with the second magnetic tablets provided thereon is attached to the first pad with the first magnetic tablets provided thereon during use of the preferred embodiment.
Figure 8B:
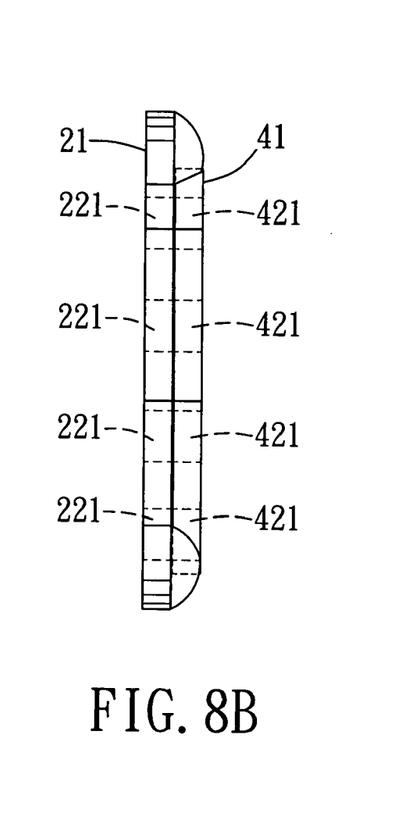

FIGS. 8A and 8B illustrate consecutive steps of how the second pad 41 can be easily and conveniently attached to the first pad 21 through the first and second magnetic tablets 221, 421. In operation, when the second pad 41 (note that the collecting bag 43 attached to the second pad 41 is not shown for the sake of clarity) is moved toward the first pad 21 without particular alignment and reaches a critical position (see FIG. 8A), the second pad 41 is automatically moved to and aligned with the first pad 21 due to the attraction forces between the first and second magnetic tablets 221, 421 (see FIG. 8B).

Figure 9A:
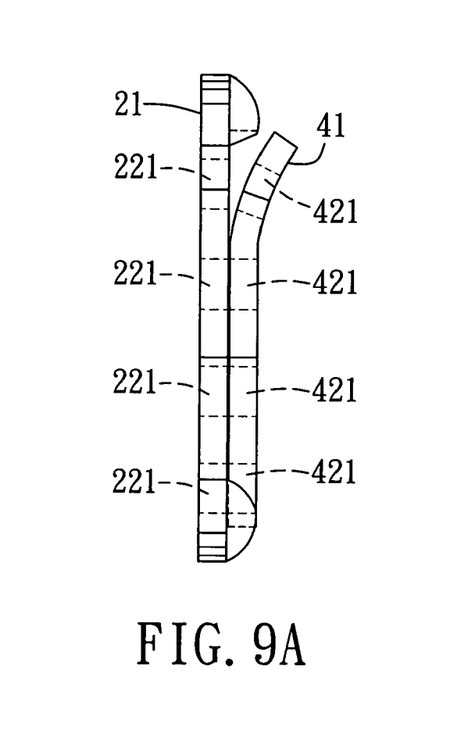
FIGS. 9A to 9C are schematic views to illustrate consecutive steps of how the second pad with the second magnetic tablets provided thereon is peeled from the first pad with the first magnetic tablets provided thereon during use of the preferred embodiment.
Figure 9B:
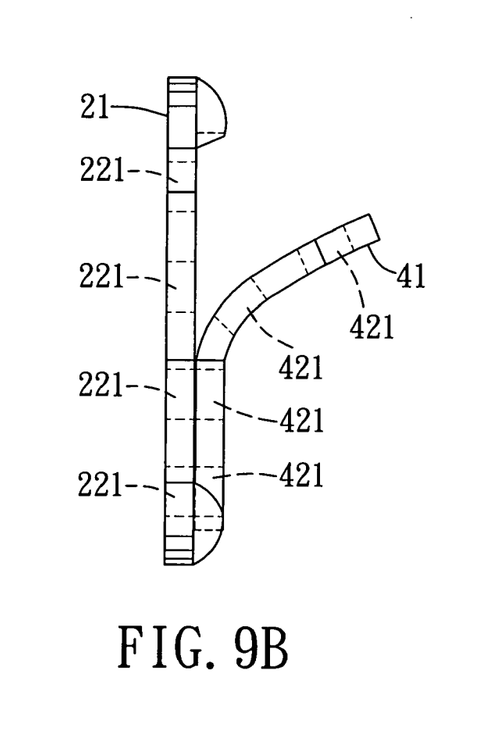
Figure 9C:
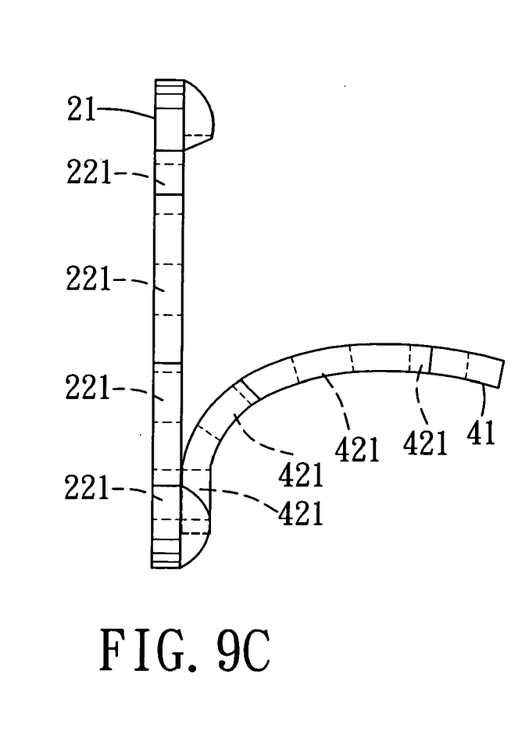
Figure 10:
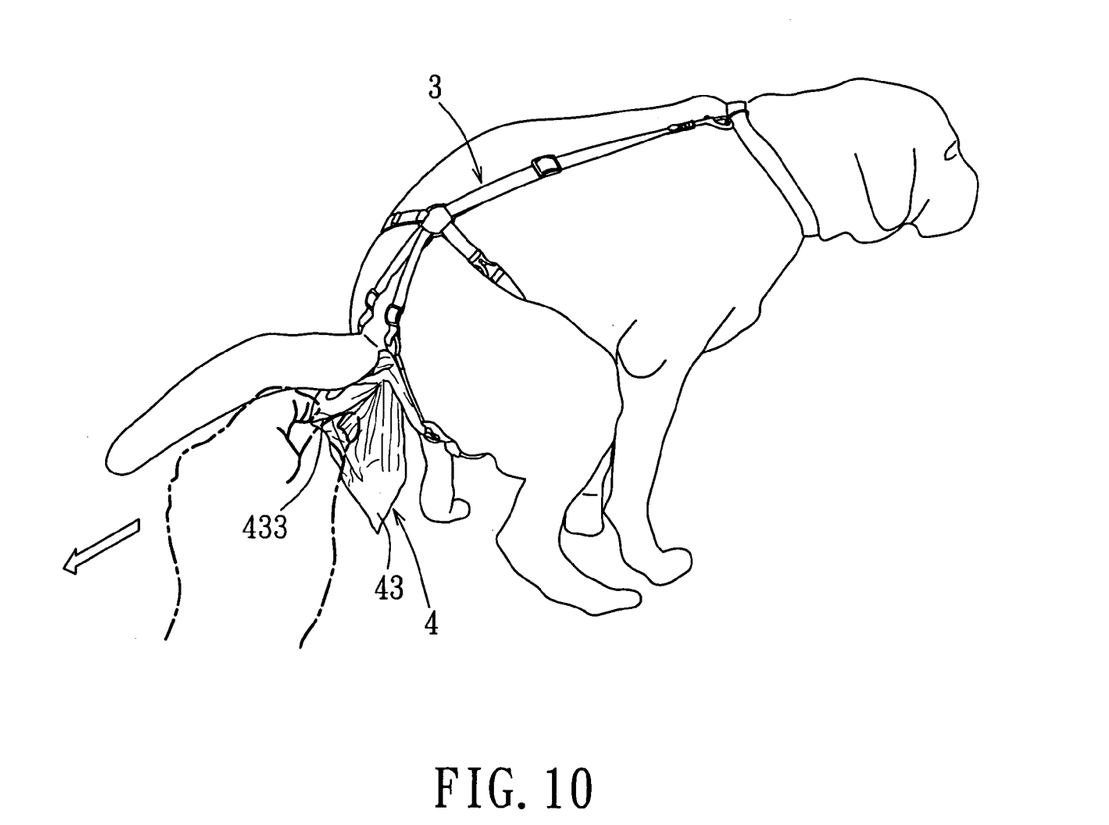
FIG. 10 is a perspective view to illustrate the preferred embodiment in a state of use for one type of dog.
Figure 11:
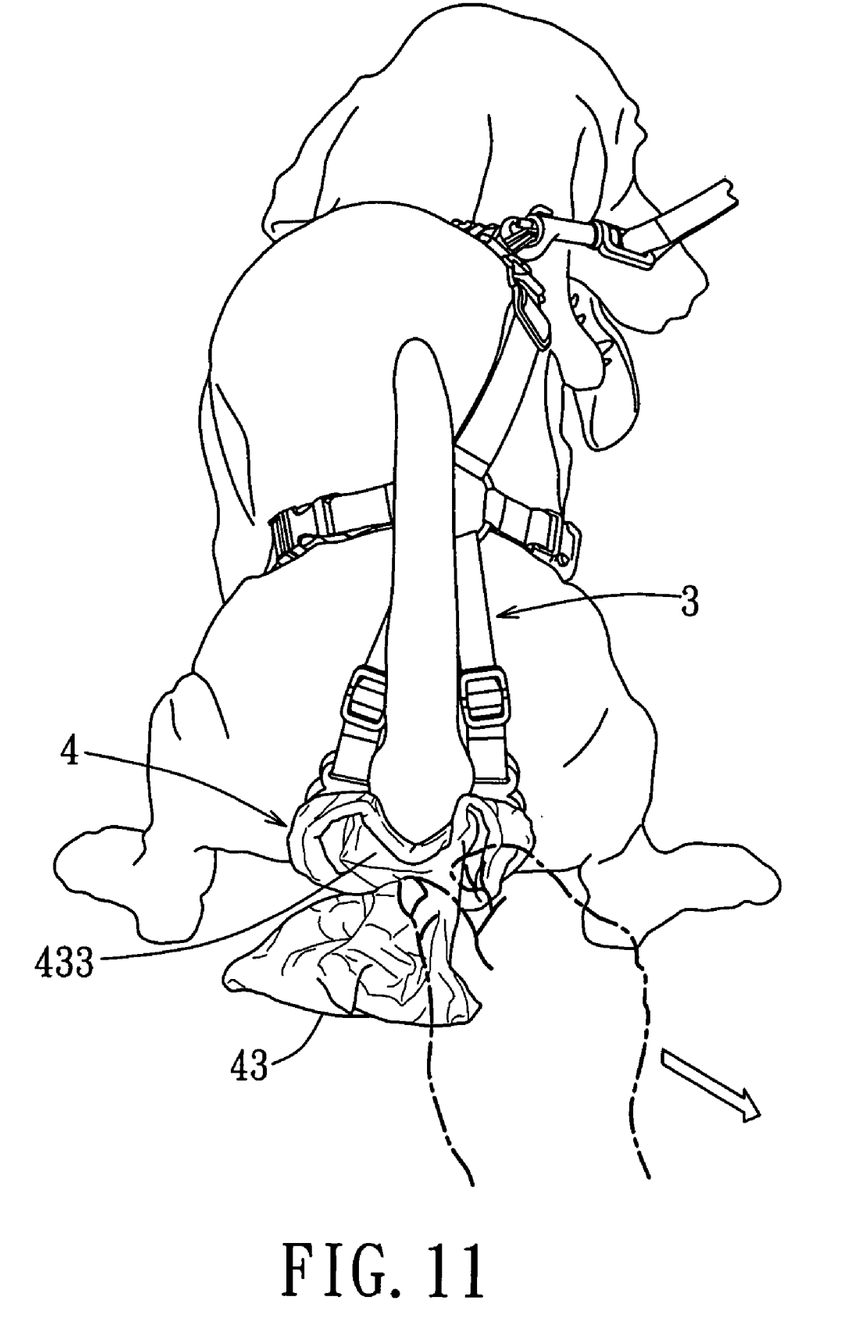
FIG. 11 is a perspective view to illustrate the preferred embodiment in a state of use for another type of dog.

FIGS. 9A to 9C illustrate consecutive steps of how the second pad 41 can be easily and smoothly peeled from the first pad 21 by virtue of the arrangement of the first and second magnetic tablets 221, 421 and the flexibility of the second pad 41, thereby facilitating removal of the collecting device 4 from the supporting base 2.

Arrangement of the first and second magnetic tablets 221, 421 can be modified so as to achieve easiness, i.e., dispensing with the pre-alignment of the second pad 41 with the first pad 21 as required by the aforesaid conventional environmental friendly animal excrement collector, in attaching the second pad 41 to the first pad 21. For example, arrangement of the first and second magnetic tablets 221, 421 can be conducted in such a manner that the contact ends 2211 of the first magnetic tablets 221 of one of the columns of the first magnetic unit 22 have a first magnetic polarity, the contact ends 2211 of the first magnetic tablets 221 of the other of the columns of the first magnetic unit 22 have a second magnetic polarity opposite to the first magnetic polarity, and the contact end 4211 of each of the second magnetic tablets 421 has a magnetic polarity opposite to that of the contact end 2211 of the respective one of the first magnetic tablets 221, or in such a manner that the contact end 2211 of each of the first magnetic tablets 221 of each of the columns of the first magnetic unit 22 has a magnetic polarity opposite to that of the contact end 2211 of an adjacent one of the first magnetic tablets 221 of the respective one of the columns of the first magnetic unit 22, and the contact end 4211 of each of the second magnetic tablets 421 has a magnetic polarity opposite to that of the contact end 2211 of the respective one of the first magnetic tablets 221. Alternatively, one of the first and second pads 21, 41 can be provided with at least one magnetic tablet, and the other of the first and second pads 21, 41 can be provided with a magnetically attractable tablet that is magnetically attracted to the magnetic tablet so as to permit magnetic attachment and alignment between the first and second pads 21, 41.

With the inclusion of the first and second magnetic tablets 221, 421 in the environmental friendly animal excrement collector of this invention, and with the formation of the gap 50 among the bent free ends 2121, 4121 of the free arm portions 212, 412 of the first and second pads 21, 41 of the environmental friendly animal excrement collector of this invention, the aforesaid drawbacks associated with the prior art can be eliminated. Moreover, attachment and detachment of the collecting bag 43 to and from the supporting base 2 can be conducted using solely one hand and relatively fast. Furthermore, since the cuff 432 of the collecting bag 43 for carrying the second pad 41 is formed simply by folding, the collecting bag 43 employed in this invention can be general plastic bags, paper bags, recycled bags or used bag, such as used sandwich bags, used cookie bags, used candy bags, used grocery bags, used fast food bags, etc. Hence, the use of the collecting bag 43 can be very environmental friendly. In addition, the second pad 41 is protected by the cuff 432 from contacting the excrement discharged from the animal, can be taken out easily and directly from the collecting bag 43, can be repeatedly used, and has a long service life, which is also environmental friendly. Also, replacement of the collecting bags 43 is relatively convenient. The U-shaped design of the first and second pads 21, 41 also permits movement of the root of the animal's tail through the gap 50 and into and out of the first and second discharging openings 210, 410, thereby preventing the aforesaid drawbacks with respect to animal's discomfort and misalignment of the supporting base with the anus of the animal as encountered in the prior art. Since the collecting bag 43 has a diameter much larger than the length of the first and second pads 21, 41 and is collapsible, the upper part 433 (see FIGS. 10 and 11) of the collecting bag 43 (i.e., the part not overlapping the second pad 41 but disposed above the second pad 41) is allowed to be interfered by the animal's tail without being damaged or causing separation of the collecting device 4 from the supporting base 2. Also, by virtue of the U-shaped design of the first and second pads 21, 41 and the structure of the collecting bag 43, the aforesaid drawbacks with respect to extension of the dog's tail into the collecting bag or misalignment between the discharging opening and the animal's anus can be avoided. Hence, not only can the environmental friendly animal excrement collector be used for dogs having a long tail, but also for dogs having a relatively short tail, such as bulldog, Schnauzer, Doberman, and the like.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. An environmental friendly animal excrement collector comprising:

a supporting base including a generally U-shaped first pad and a first magnetic unit having a plurality of first magnetic tablets, said first pad defining a first discharging opening and being formed with a plurality of spaced apart first retaining holes that are distributed along the length of said first pad in such a manner to surround said first discharging opening, each of said first magnetic tablets being received securely in a respective one of said first retaining holes;

a harness unit connected to said supporting base and adapted to harness said supporting base to an animal; and a collecting device attached magnetically and detachably to said supporting base and including a generally U-shaped second pad, a second magnetic unit having a plurality of second magnetic tablets, and a flexible collecting bag connected to said second pad and defining an inlet, said second pad being formed with a plurality of spaced apart second retaining holes corresponding respectively to said first retaining holes, each of said second magnetic tablets being received securely in a respective one of said second retaining holes and being attracted magnetically to a respective one of said first magnetic tablets so as to permit attachment of said collecting bag to said supporting base and alignment of said inlet of said collecting bag with said first discharging opening of said first pad, wherein each of said first and second pads has two free arm portions and a back portion interconnecting said free arm portions, said free arm portions of each of said first and second pads being opposite to each other in a first direction, said free arm portions of each of said first and second pads having bent free ends bent therefrom toward each other, said bent free ends of said free arm portions of said first and second pads cooperatively defining a gap there among, said gap being opposite to said back portions of said first and second pads in a second direction perpendicular to said first direction and being in spatial communication with said first discharging opening in said first pad, and wherein the first discharging opening in the first pad extends from the back portion to the free ends of the free arm portions of the first pad.

2. The environmental friendly animal excrement collector of claim 1, wherein each of said first and second pads has two free arm portions, said first magnetic unit being divided into two columns of said first magnetic tablets disposed respectively at said free arm portions of said first pad, said second magnetic unit being divided into two columns of said second magnetic tablets disposed respectively at said free arm portions of said second pad, each of said first and second pads having a contact surface, said contact surfaces of said first and second pads facing toward each other in a face-to-face manner, each of said first and second magnetic tablets having a contact end that is disposed adjacent to said contact surface of a respective one of said first and second pads.

3. The environmental friendly animal excrement collector of claim 2, wherein said contact ends of said first magnetic tablets of said columns of said first magnetic unit have a first magnetic polarity, said contact end of each of said second magnetic tablets having a second magnetic polarity opposite to said first magnetic polarity.

4. The environmental friendly animal excrement collector of claim 2, wherein said contact ends of said first magnetic tablets of one of said columns of said first magnetic unit have a first magnetic polarity, said contact ends of said first magnetic tablets of the other of said columns of said first magnetic unit having a second magnetic polarity opposite to said first magnetic polarity, said contact end of each of said second magnetic tablets having a magnetic polarity opposite to that of said contact end of the respective one of said first magnetic tablets.

5. The environmental friendly animal excrement collector of claim 2, wherein said contact end of each of said first magnetic tablets of each of said columns of said first magnetic unit has a magnetic polarity opposite to that of said contact end of an adjacent one of said first magnetic tablets of the respective one of said columns of said first magnetic unit, said contact end of each of said second magnetic tablets having a magnetic polarity opposite to that of said contact end of the respective one of said first magnetic tablets.

6. The environmental friendly animal excrement collector of claim 1, wherein each of said first and second magnetic tablets is cylindrical in shape and is received fittingly in the respective one of said first and second retaining holes.

7. The environmental friendly animal excrement collector of claim 1, wherein said bent free end of each of said free arm portions of each of said first and second pads is tapered.

8. The environmental friendly animal excrement collector of claim 2, wherein said collecting bag has a main body that has an open end defining said inlet, and a cuff folded curvedly from said open end of said main body to define a cuff space there- between, said second pad defining a second discharging opening that conforms to said first discharging opening, and being inserted removably into said cuff space, said open end of said main body being sandwiched between and being in contact with said contact surfaces of said first and second pads, said main, body of said collecting bag extending through said second discharging opening along an inner periphery of said second discharging opening.

9. The environmental friendly animal excrement collector of claim 8, wherein said collecting bag is in the form of a plastic bag.

10. The environmental friendly animal excrement collector of claim 1, wherein said harness unit includes a connecting ring, a front trailing strap having a front end adapted to be connected to a neck collar and a rear end connected to said connecting ring, a pair of rear trailing straps having front ends connected to said connecting ring and rear ends connected to said first pad, and a pair of side trailing straps having front ends connected to said connecting ring and rear ends connected to said first pad.

11. The environmental friendly animal excrement collector of claim 10, further comprising a clamping unit for binding an end portion of a selected one of said front arid rear trailing straps and said side trailing straps in order, said clamping unit including two flexible clamping pieces, each of which has two opposite ends that are respectively formed with a tongue and a groove, said tongue and said groove of one of said clamping pieces being engageable respectively with said groove and said tongue of the other of said clamping pieces in a press fit manner.

12. The environmental friendly animal excrement collector of claim 1, wherein said second pad is flexible.

* * * * *